United States Patent
Hagemeyer et al.

(10) Patent No.: US 6,361,266 B1
(45) Date of Patent: Mar. 26, 2002

(54) ROTATABLE FEEDGATE

(75) Inventors: Roland L. Hagemeyer, Rochelle; Kenneth P. Manon, Lindenwood, both of IL (US)

(73) Assignee: The Louis Berkman Company, Steubenville, OH (US)

(*) Notice: Subject to any disclaimer, the term of this patent is extended or adjusted under 35 U.S.C. 154(b) by 577 days.

(21) Appl. No.: 09/246,460

(22) Filed: Feb. 9, 1999

Related U.S. Application Data (63) Continuation of application No. 08/961,320, filed on Oct. 31, 1997, now abandoned, which is a continuation of application No. 08/524,492, filed on Sep. 2, 1995, now Pat. No. 5,823,734.

(51) Int. Cl.$^7$ ............................................. B60P 001/36
(52) U.S. Cl. ..................... 414/528; 414/519; 414/501; 414/502; 239/672; 239/676; 222/516; 222/548
(58) Field of Search ................................ 239/676, 664, 239/672; 222/290, 474, 481, 502, 508, 516, 537, 556, 548, 415; 414/502, 528, 414, 519, 520, 501

(56) References Cited

U.S. PATENT DOCUMENTS

| | | |
|---|---|---|
| 842,238 A | 1/1907 | Park |
| 947,538 A | 1/1910 | Barrow |
| 1,182,747 A | 5/1916 | Brown |
| 1,563,202 A | 11/1925 | Lentz |
| 1,735,930 A | 11/1929 | Miller |
| 1,746,410 A | 2/1930 | Tolman, Jr. |
| 1,909,238 A | 5/1933 | Thompson |
| 2,045,489 A | 6/1936 | Payette |
| 2,338,320 A | 1/1944 | Donovan |
| 2,375,063 A | 5/1945 | Andershock |
| 2,484,325 A | 10/1949 | Wachter |
| 2,517,151 A | 8/1950 | Weston |
| 2,609,952 A | 9/1952 | Balzer |
| 2,641,477 A | 6/1953 | Davis |
| 2,658,795 A | 11/1953 | Nicholson |
| 2,774,602 A | 12/1956 | Sanderson |
| 2,805,863 A | 9/1957 | Klostermann |
| 2,870,923 A | 1/1959 | Jewell |
| 2,967,056 A | 1/1961 | D'Amato |
| 2,969,987 A | 1/1961 | De Biasi |
| 3,097,711 A | 7/1963 | Clark |

(List continued on next page.)

OTHER PUBLICATIONS

Swenson Spreader Electric Liquid Spray System Brochure.
Air–Flo Multi–Purpose Mini–Flo 'N Dump for 2 to 3 Yard Trucks Brochure.
Everset Snow & Ice Control Equipment Brochure.
Swenson Spreader Uni–Vee Series Brochure.
London 4Way Combination Four–Way Dump Truck, Salt and Sand Spreader Brochure.
Front or Rear Spread Models—Air–Flo Flo 'N Dump Multi–Purpose truck Body Brochure.
Air–Flo Extra Heavy–Duty Flo 'N Dump Body Brochure.
Air–Flo Flo 'N Dump Multi–Purpose Truck Body Brochure.
Swenson Spreader L/D Series Aviation Spreaders Brochure.
Picture of rotatable feedgate mounted in the back of a truck.
Econo Commander Dependable Spreading at Economical Pricing Brochure.

*Primary Examiner*—Frank E. Werner
(74) *Attorney, Agent, or Firm*—Vickers, Daniels & Young (57) ABSTRACT

A dump truck having a dump body which includes an adjustable feedgate for adjusting the size of a passageway through a rear opening at the rear of the dump body. The feedgate is rotatably mounted within the rear opening to provide for improved control of the flow of materials within the dump body which pass through the rear opening when the feedgate is positioned into an open position. A side guide is incorporated into the feedgate to provide additional control of the flow rate of materials through the rear opening especially at low feed rates.

39 Claims, 6 Drawing Sheets

U.S. PATENT DOCUMENTS

| | | |
|---|---|---|
| RE25,709 E | 1/1965 | Swenson |
| 3,189,355 A | 6/1965 | Swenson |
| 3,191,944 A | 6/1965 | Watts |
| 3,304,093 A | 2/1967 | Van Der Lely |
| 3,310,293 A | 3/1967 | Zimmerman |
| 3,329,436 A | 7/1967 | Fyrk |
| 3,542,297 A | 11/1970 | Wyrick |
| 3,583,645 A | 6/1971 | Murray |
| 3,693,890 A | 9/1972 | Torrey |
| 3,768,737 A | 10/1973 | Tobias |
| 3,790,090 A | 2/1974 | Lorenc |
| 3,917,236 A | 11/1975 | Hanson |
| 4,022,386 A | 5/1977 | Caye |
| 4,068,769 A | 1/1978 | Sweet et al. |
| 4,162,766 A | 7/1979 | Ten Broeck |
| 4,266,731 A | 5/1981 | Musso, Jr. |
| 4,382,568 A | 5/1983 | Schertz |
| 4,568,237 A | 2/1986 | Krause |
| 4,685,619 A | 8/1987 | Harder |
| 4,886,214 A | 12/1989 | Musso, Jr. |
| 5,310,119 A | 5/1994 | Musso, Jr. |
| 5,397,172 A | 3/1995 | Musso, Jr. |
| 5,400,974 A | 3/1995 | Musso, Jr. |
| 5,437,499 A | 8/1995 | Musso |

ROTATABLE FEEDGATE

This application is a continuation of Ser. No. 08/961,320 filed Oct. 31, 1997, now abandoned, which is a continuation of Ser. No. 08/524,492 filed Sep. 2, 1995 now U.S. Pat. No. 5,823,734.

The present invention relates to art of trucks and more particularly to a new and improved dump truck having an integrated spreader system which allows for improved control of dispensing the contents of the dump truck.

BACKGROUND OF THE INVENTION

Trucks such as dump trucks have commonly been used to convey materials such as salt and/or sand for the purposes of spreading these materials onto road surfaces to improve the traction of the road surface during hazardous conditions. The materials in the truck are commonly dispensed by tilting the dump body of the truck thereby releasing the goods from the dump body and/or conveying the materials within the dump body a out through an opening in the rear of the dump body. Dump trucks with integrated spreader systems are illustrated in U.S. Pat. Nos. 4,886,214 and 4,266,731. Both these patents illustrate the use of an integrated spreader system wherein the bottom of the dumper body includes a conveyor which is regulated to control the dispensing rate of the materials within the dump body and further include a rear spreader which disperses the materials from the dump body onto the road surface. For many years, asphalt spreading trucks have included a dump body with two openings in the rear tailgate. These openings included rotary feedgates that were manually moveable in a vertical direction to control the flow of asphalt through the openings as the asphalt was being spread with the dump body raised. Although prior spreading systems have improved the control of the dispensed materials from the dump body, a control mechanism for controlling the size of the passageway out of the dump body has yet to be developed which can be easily adjusted manually and/or automatically to provide better control of the dispensed materials from the dump body. Due to the lack of material conveyance designs which are easy and convenient to use and have the versatility to control the rate of dispense materials from a dump body, there has been a demand for a mechanism which both improves the control of the dispensing rate of materials from a dump body and which can be easily adjusted manually or automatically.

SUMMARY OF THE INVENTION

The present invention relates to trucks, particularly dump trucks and more particularly to a new and an improved dump truck which includes an improved conveyance mechanism for controlling the dispense rate of materials within the dump body.

In accordance with a preferred embodiment of the present invention, there is provided a truck having a dump body having two side walls, a base and a rear end and front end. The rear end includes an opening which can be manipulated to control the dispensement rate of the contents within the dump body through the rear opening. The size of the aperture in the rear open is manipulated by an adjustable feedgate which is rotatably mounted in the rear opening. The side walls of the dump body are positioned essentially perpendicular to the base of the dump body or are angularly positioned with respect to the base so as to provide sloped surfaces. Preferably, the side walls of the dump body are angually positioned to provide slope surfaces which slope downward to the base of the dump body. At the base of the dump body, there is incorporated therein a conveyor system which rearwardly moves material within the dump body toward the opening in the rear end of the dump body. Preferably, the conveyor system extends longitudinally from the forward end to the rear end of the dump body and is evenly spaced between the two side walls of the dump body. The rear opening is preferably in longitudinal alignment with the conveyor system so that the materials in the dump body moved to the opening by the conveyor system will directly exit the dump body through the opening. The rear opening preferably has a width which is generally equal to the width of the conveyor belt of the conveyor system and the height of the opening is preferably less than half the height of the dump body. The rotatably adjustable feedgate mounted on the rear end of the dump body and preferably in the rear opening is adjustable by manual and/or mechanical means. The feedgate is designed to regulate the rate at which the material contents of the dump body are dispensed from the dump body through the rear opening.

In accordance with the present invention, the rear end of the dump body includes a tailgate which is pivotly attached to the rear end of the dump body. The tailgate preferably includes the rear opening. The tailgate of the dump body permits the truck to be used in both a regulated closed mode of operation wherein the tailgate is in the closed position and the contents of the dump body are conveyed toward the rear end of the dump body and through the rear opening in a controlled manner. The feedgate is preferably mounted on the tailgate and in the rear opening such that the tailgate can be positioned in an opened mode wherein the tailgate is laid in a flat open position extending in essentially the same plane of the base of the truck dump body. The design of the feedgate allows for operation in both modes without requiring a complicated configuration or operation to be used in either one of these modes.

In accordance with another aspect of the present invention, the rear opening includes two side walls and a top wall and the feedgate is rotatably mounted in the rear opening to the two side walls of the rear opening. Such a mounting configuration facilitates in a compact and simplified. mechanism for controlling the feedgate position within the rear opening of the dump body. The feedgate includes an edge guard which is in contact with or closely adjacent to the conveyor belt when the feedgate is in the closed position. In the closed position, the feedgate blocks the access of the materials in the dump body from passing through the rear opening. As the feedgate is rotated into an open position, the edge guard of the feedgate upwardly retracts in a generally upward arc from the conveyor belt surface and controllably allows materials in the dump body to pass through and/or be conveyed through the rear opening.

In accordance with another feature of the present invention, the feedgate includes a feed guide having two panels positioned generally perpendicular to one another and rotatably mounted to each of the side walls of the rear opening. The feed guide is preferably mounted such that the feed guide can either be immediately retracted from the base of the dump body as the edge guard is retraced or delay in restricting until the edge guard has retracted to a minimum predefined position. Once the edge guard has reached or exceeded the predefined position, the edge guard and the feed guide simultaneously retract until the feedgate is positioned in the completely open position. The feed guide also can be mounted such that the feed guide retracts at a similar or different rate from the retraction rate of the edge guard. The feed guide is designed to add additional control to the dispensement of the materials from the dump body by limiting the size of the rear opening as the edge guard is retracted. This feedgate design provides additional control to the dispensement rate of the materials at especially low dispensement rates.

In accordance with another aspect of the present invention, the feedgate is designed to permit the truck to be readily converted between a regulated closed mode of operation and an open mode of operation such that the dump body is not adversely affected with capacity and strength in either the regulated closed mode of operation or the open mode of operation. Such a design allows the tailgate to be used for hauling, dumping and spreading material from the dump body of the truck.

In accordance with another aspect of the present invention, the feedgate can be mounted such that the feedgate can be manually opened and closed in an easy and efficient manner. Furthermore, the feedgate is also designed such that an automated system such as a hydraulic drive may be connected to the feedgate to move the feedgate in both an open and closed position. The hydraulic system can include an electrical control system arranged in the cab of the truck to allow an operator to operate the hydraulic system and control the dispensement rate of materials from the dump body of the truck.

The primary object of the present invention is to provide a truck which can dispense material in a controlled manner.

Another object of the present invention is to provide a truck having a dump body which dump body includes an opening having a feedgate which is rotatably incorporated into the opening of the dump body. The rotatably mounted feedgate is designed to control the rate of dispensement of materials from the dump body through the feedgate.

In accordance with still another object of the present invention, the feedgate is mounted into the tailgate of the dump body such that the tailgate can be positioned in a regulated closed mode of operation to control the dispensement of the contents of the dump body through the feedgate and an open mode of operation whereby the tailgate in a flat open position.

In accordance with still yet another object of the present. invention, the feedgate includes two feed guides mounted to the side of the rear opening which are designed to regulate the flow of materials from the receptacle through the feedgate especially at relatively low feed rate settings.

Another object of the present invention is a feedgate which is designed to be opened and closed manually or by automated operation.

Another object of the present invention, the feedgate design is simple and easy to operate and provides excellent control of the rate of dispensement of materials from the dump body.

Still yet another object of the present invention, the dump body includes a conveyor system incorporated into the base of the dump body which acts in cooperation with the feedgate to dispense materials from the dump body to better control the rate of dispensing of the materials from the dump body.

Yet another object of the present invention is to provide a system for controlling the rate of dispensement of materials from a truck which is economical to install and easy to operate.

These and other objects and advantages will become apparent to those skilled in the art upon reading the following description taken together with the preferred embodiment disclosed in the accompanied drawings.

BRIEF DESCRIPTION OF THE DRAWINGS

Reference may now be made to the drawings, which illustrate various preferred embodiments that the invention may take in physical form and in certain parts and arrangement of parts wherein.

DETAILED DESCRIPTION OF THE PREFERRED EMBODIMENTS

Figure 1:
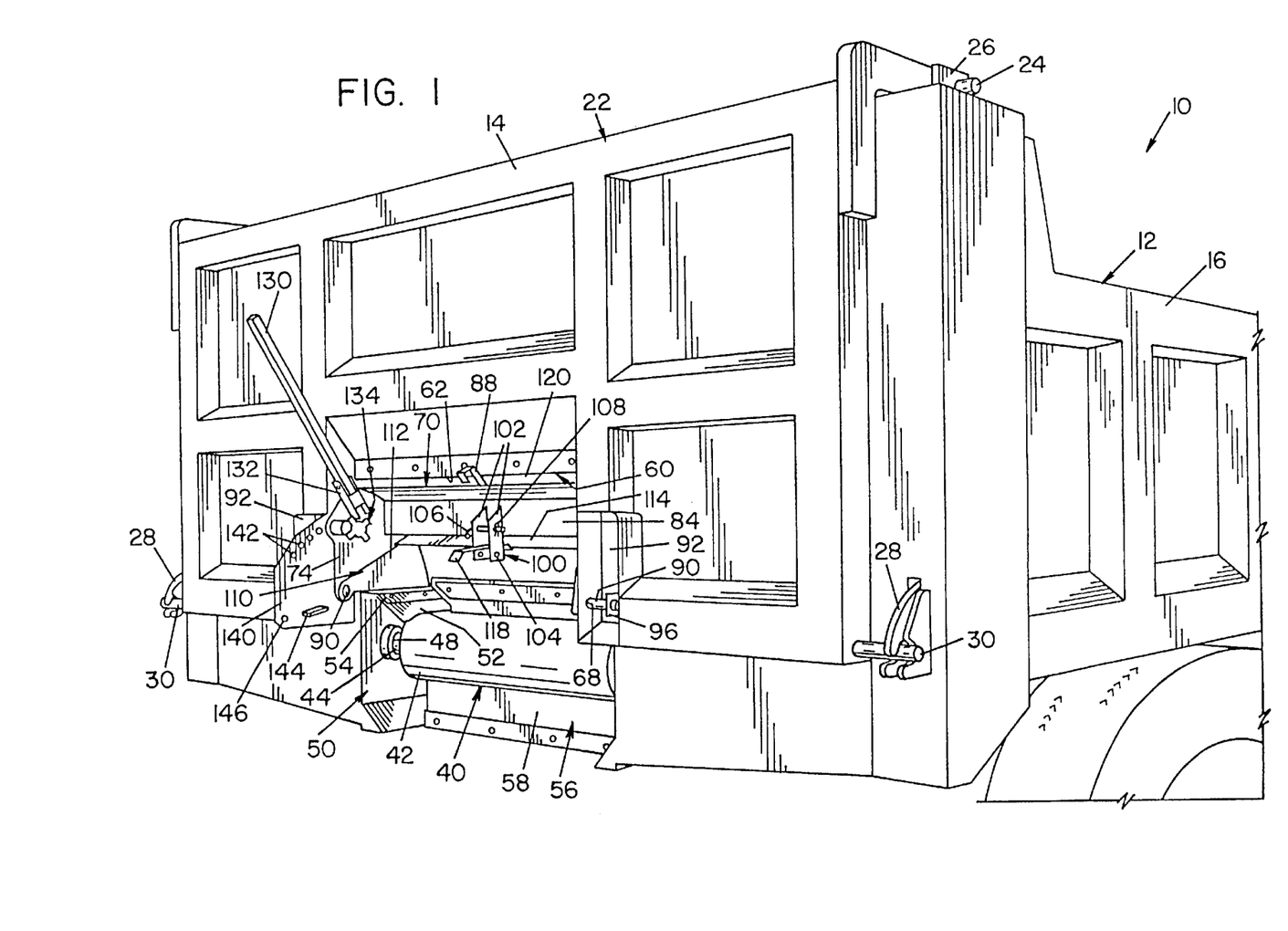
FIG. 1 is a partial perspective view of a truck which includes the rotatably feedgate in accordance with the present invention.

Referring now to the drawings wherein the showings are for the purpose of illustrating preferred embodiments of the invention only and not for the purpose of limiting the same, FIG. 1 illustrates a dump truck 10 which includes the rotatable feedgate of the present invention. Truck 10 includes a dump body 12 mounted on a truck frame, not shown. The dump body may be elevated for pivotal movement about a rear axis such that the dump body is pivoted between a normal or horizontal position. Although not shown, dump body 12 may be raised by a hydraulic lift such as a telescopic lift which is connected to the truck frame at the forward end of truck 10 to hydraulically raise and lower dump body 12 in a conventionally known manner.

Dump body 12 includes a rear end 14, two sides 16 and 18, a base 20. and a front side. Rear end 14 preferably is a movable tailgate 22. As shown in FIG. 1, tailgate 22 is positioned in a closed position. In a conventional manner, tailgate 22 is pivotally mounted either at the top or bottom of the tailgate. As shown in FIG. 1, tailgate 22 is mounted for pivotal movement about an upper transverse horizontal axis. A pair of tailgate pivot pins 24 are mounted on the tailgate and are inserted in cooperation with pivot bearings 26 which are attached to the back top ends of sides 16 and 18.

As shown in FIG. 1, tailgate 22 is maintained in close position by tailgate latches 28 which are used to latch tailgate latch bars 30 which are attached to the tailgate. The tailgate latches are proximately located near lower back ends of sides 16 and 18. The latches are used to latch the tailgate in its closed position and to mount the tailgate for pivotal movement about a lower transverse horizontal axis. Tailgate latches 28 are unlatched to dump the material contents of dump body 12 through the rear of dump body 12 when the dump body is elevated from the front of the truck.

Tailgate 22 can be pivoted downwardly from the lower transverse axis into an open flat position by extending it rearwardly from the bottom of the dump body. Although not shown, tailgate pivot pins 24 are disengaged from tailgate pivot bearing 26 and tailgate 22 is then be lowered to its lower flat open position. The procedure is reversed for remounting the tailgate for pivotal movement about its upper transverse axis. A chain or bar not shown can be attached to the tailgate and the dump body side 16 and/or 18 to maintain the tailgate in its flat open position. When the tailgate is in its flat open position, the rear end of the dump body is opened and the inner flat face of the tailgate provides a rearward extension of the generally flat dump body base of container 12. The truck can then be used for open truck hauling and open truck dumping when the tailgate is positioned in the flat open position.

Figure 2:
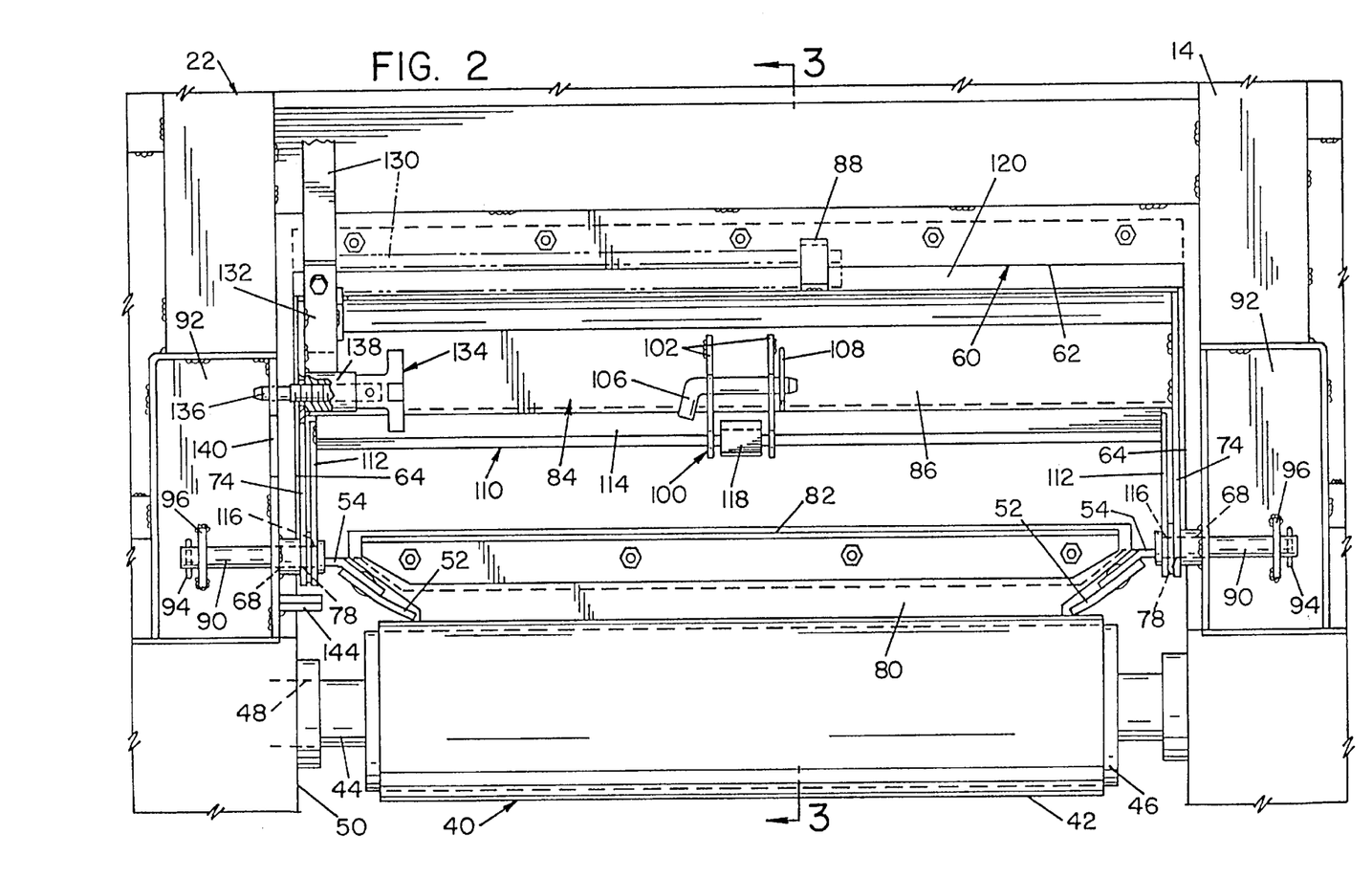
FIG. 2 is an elevational view of the rear of the truck as shown in FIG. 1.
Figure 3:
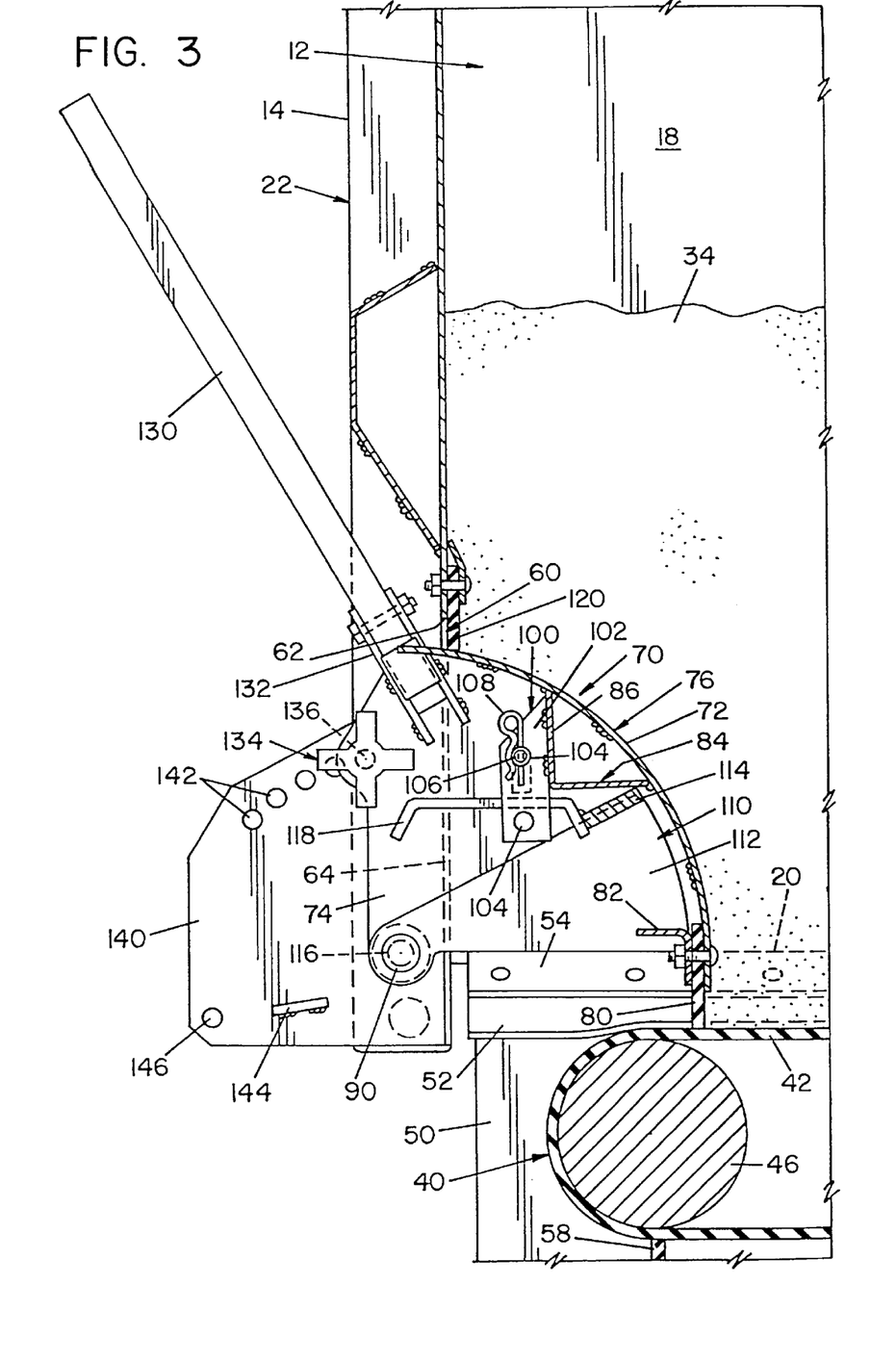
FIG. 3 is a cross-sectional view taken along line 3—3 in FIG. 2 which illustrates the rotatable feedgate in an enlarged closed position.

As best illustrated in FIGS. 1–3, a conveyor system 40 is integrated into the dump body 12 of truck 10 to provide a multi-purpose truck which may be used in both a dump mode and a regulated closed mode by simple manual or automatic conversion of truck 10 between these two modes. The dump mode of operation is the dispensement of materials from the dump body through tailgate 22 when tailgate latch bars 30 disengages from tailgate latches 28 as dump body 12 is raised. The regulated closed mode of operation is the dispensement of materials from the dump body through an opening 60 when the tailgate is latched in the closed position.

The conveyor system 40 comprises a central longitudinally extending conveyor belt 42 integrated into the base of dump body 12. Conveyor 40 is preferably mounted in a conveyor recess 50 in base 20 of the dump body 12 such that conveyor belt 42 is receded from the surface plane of base 20. The conveyor system comprises a central, longitudinally extending and conveyor belt 42 integrated into the base of container 12. The effective width of conveyor system is established by conveyor recess 50 which is an overlying, longitudinally extending opening having a pair of laterally spaced down turned edges of the outer co-planar sections of the dump body base. The conveyor recess includes sloped surfaces 52 mounted on slope mount 54. The sloped surface forms a sloped surface from the surface plane of base 20 to the top surface of the conveyor belt. The sloped surfaces are preferably flexible so as not to damage the conveyor belt and are preferably made of a rubber material which is durable and wear resistant to the various types of materials 34 conveyed in the dump body. A back flow shield 56 is mounted in conveyor recess 50 below conveyor belt 42. Back flow shield 56 includes a blade 58 which is preferably flexible and is positioned in contact or closely adjacent to the bottom surface of conveyor belt 42. The back flow shield is designed to prevent materials conveyed by the conveyor belt to be drawn under the truck. The conveyor system also includes a front sprocket shaft, not shown, and rear sprocket shaft 44, each sprocket shaft having a laterally spaced conveyor sprocket 46 for supporting a laterally spaced conveyor belt 42. The sprocket shafts are mounted into recess 50 in shaft holes 48. Conveyor belt 42 may be a chain linked belt, a fabric belt, a rubber belt, etc. The belt may be flat or include ribs to facilitate in the conveyance of material 34 in the dump body. A suitable hydraulic electric or combustion drive mechanism, which is not shown, is connected to the front or rear sprocket shaft 44 for driving conveyor belt 42. The conveyor belt, sprocket shafts and conveyor sprockets are all mounted in recess 50 such that the top of the conveyor belt is preferably positioned below the surface of base 20. As shown in FIGS. 1 and 2, the conveyor system is preferably positioned along the longitudinal center of base 20 of dump body 12.

As previously discussed, side walls 16 and 18 of the dump body are preferably sloped to direct materials 34 toward the center of base 20, into recess 50 and onto the surface of belt 42.

The conveyor system can be used in a rear or front dispensing mode of operation by operating the conveyor system to convey the material contents of the dump body to the rear end or front end of dump body to dispense the material in the back of the rear wheels of truck 10. For a rear dispensing mode a rear spinner, not shown, is preferably mounted onto the rear truck frame or tailgate 22 to dispense the materials to the rear of the truck and spread materials onto the roadway. The rear spreader is preferably in longitudinal alignment with the conveyor system and the tailgate opening so as to properly spread the materials exiting opening 60. A gravity chute, not shown, is preferably included to direct the dispense materials from the tailgate opening to the spinner thereby properly spreading the material throughout the roadway. The spinner is also preferably mounted such that it can be rotated and positioned below the gravity chute or rotated in a retracted position to allow the tailgate to be opened and the materials removed from dump body 12 without coming in contact with the spinner. A suitable hydraulic drive or electric motor system is preferably connected to the spinner to drive the spinners. A control system is preferably integrated with the spinners conveyor system to control the amount of materials dispensed from dump body 12 to spread such materials throughout the roadway.

Referring to FIGS. 1 and 2, tailgate 22 includes a feedgate 70 which controls the flow rate of materials 34 out of dump body 12 which are conveyed to tailgate 22 by conveyor system 40 when the truck is in the regulated closed mode. Feedgate 70 is mounted on tailgate 22 and within opening 60. As discussed above, opening 60 is preferably positioned to be in longitudinal alignment with conveyor system 40. As shown in FIG. 1, opening 60 is rectangular in shape and extends from the base of tailgate 22 to a height of less than about ½ the height of tailgate 22.

Feedgate 70 is mounted to be selectively positioned either manually or automatically to be used in several modes of operation. Opening 60 includes a tailgate top 62 and two sides 64. Preferably, opening 60 is 1 to 5 feet wide and 1 to 4 feet in height.

Referring now to FIG. 3, feedgate 70 includes a face plate 72 and two side plates 74 which forms a feedgate cap 76. Attached to the front edge of face plate 72 is edge guard 80. Edge guard 80 is preferably a flexible material made of a flexible and durable rubber material. The use of a flexible edge guard eliminates or significantly reduces damage to the conveyor belt 42 when the feedgate is in the closed position. Edge guard 80 is shaped such that the edge guard will fit down into and between conveyor recess 50. As shown in FIG. 3, edge guard 80 is positioned closely adjacent to and/or engages the top surface of conveyor belt 42 when feedgate cap 76 is in the closed position.

As shown in FIG. 3, feedgate 70 is in the closed position. In the closed position, the base of face plate 72 and the base of side plates 74 of cap 76 are in contact with and in parallel relationship to base 20 of dump body 12 and edge guard 80 is in contact with the top of conveyor belt 42. In the closed position, materials 34 in dump body 12 are prevented from passing through opening 60 even when conveyor system 40 is in operation. As shown in FIG. 3, cap 76 closes the passageway through opening 60.

The width of face plate 72 is designed to be less than the width of tailgate opening 60 to allow the face plate to pass through the opening. Face plate 72 is preferably curvilinear in shape. Face plate preferably has a radius slightly less than the distance between pin hole 78 and the top 62 of opening 60. When cap 76 is in the closed position, face plate 72 extends from base 20 to top 62 of opening 60. The arcuate shape of face plate 72 allows the face plate to be easily rotated between the closed and completely open position as illustrated in FIGS. 3–6. Two sides plates 74 are attached to the edges of face plate 72 to form cap 76. The side plates are preferably welded together, but can also be bolted together. The feedgate is attached in opening 60 by positioning side plates 74 into opening 60 and closely adjacent to side walls 64 of opening 60. Side plates 74 each include a pin opening 78 located near the lower back edge of the side plates and generally in the surface plane of base 20 for axial movement of the feedgate about base 20. Pin opening 78 of each side plate is aligned with a pin hole 68 located in each side wall 64 of opening 60. A feedgate pin 90 is inserted through pin opening 78 and pin hole 68 of each side plate until the end of each pin passes into each pin chamber 92 thereby attaching cap 76 in opening 60. Both feedgate pins 90 are locked into position by attaching a pin clip 94 to the end of pin 90. A bracket 96 supports pin in pin chamber 90. Pin chamber 92 is a cavity in tailgate 22 positioned adjacent to each side wall 64 of opening 60. The pin chamber allows for easy access to pin 90 to allow an operator to easily mount and dismount the cap 76 in opening 60. The pin arrangement for the feedgate cap allows the feedgate cap to be rotated within opening 60 about pin 90.

Face plate 72 includes a guide lift 82 attached to the interior front edge of the face plate. Face plate 72 also includes a housing 84 attached on the interior edge of face plate 72 and evenly positioned between side plates 74. Housing 84 is generally "L" shaped and forms a generally straight surface 86 which lies in a plane that is generally perpendicular to base 20 of dump body 12 when feedgate 70 is in a closed position. A bar holder 100 is attached to surface 86 and includes two holder flanges 102 mounted parallel to one another. Each holder flange includes at least two holes 104 aligned such that a holder pin 106 can be inserted between the two holder flanges. A pin lock 108 is used to secure pin 106 in the holes of the holder flange. Guide lift 82 is designed to lift side guide 110 which is described in more detail below.

Feedgate cap 76 includes a safety bar 88 which is connected to the top edge of face plate 72. Safety bar 88 holds lever 130, when the lever is folded down as shown in phantom lines in FIG. 2.

A cap seal 120 is attached to the top of opening 60 to seal the space between face plate 72 and the top of opening 60. The plate seal is preferably a flexible and durable material such as rubber which is designed to slightly flex as feedgate cap 76 is opened and closed and to maintain a tight seal with the surface of the face plate. The seal formed by cap seal 120 prevents materials 34 in dump body 12 from passing between top 62 of opening 60 and cap 76.

Referring now to FIGS. 1–3, feedgate 70 includes a side guide 110. Side guide 110 includes two side panels 112 and a guide top 114 extending between the two side panels. Each side panel 112 is positioned between and closely adjacent to side plates 74. Side guide 110 is movably attached to pin 90 by passing pin 90 through pin hole 116 on each side panel 112. As shown in FIG. 3, the side panels of side guide 110 preferably rests on base 20 and adjacent to each side of conveyor recess 50 when feedgate 70 is in the closed position. Each guide side preferably extends nearly to the interior surface of face plate 72 and has a arcuate shaped front edge having a radius which is slightly less than the radius of the face plate. As will be described in more detail below, side guide 110 cooperates with cap 76 to control the flow rate of materials 34 from dump body 12, through opening 60, especially at slower flow rates.

Side guide 110 preferably moves independently from cap 76. As a result, side guide 110 can be configured either to move simultaneously with the movement of cap 76 or move with cap 76 only after the cap has moved beyond a preset position. Attached to guide top 114 is guide bar 118. Guide bar 118 is preferably positioned betweens side panels 112 and the guide bar.

As shown in FIG. 1, feedgate 70 includes a lever 130 for manual opening and closing of the feedgate. Lever 130 is located near the top edge of face plate 72 and is mounted on lever mount 132 which is attached to side plate 74 nearest to side 18 of dump body 12. A feedgate lock pin 134 is positioned on side plate 72 adjacent to lever mount 132. Positioned adjacent to lever 132 is a lock flange 140 extending outwardly from tailgate 22. Lock flange 140 includes several lock holes 142 and a flange platform 144. Lock flange 140 is designed to lock feedgate 70 into position. Lock pin 134 is inserted into lock flange 140 to secure feedgate 70 in its various open and closed positions. Feedgate is locked into a desired position by moving lever 130 until lock pin 134 is aligned with the desired lock hole 142. Lock pin 134 is then inserted into lock hole 142 thereby securing feedgate 70 into position. As best illustrated in FIG. 2, lock pin 134 includes a pin 136 threaded into a mounting boss 138 on lock flange 140. In the completely open position of feedgate 70, the edge of side plate 74 rests upon flange platform 144. Lock pin 134 is positioned in open lock hole 146 thereby locking feedgate 70 in a completely open position.

Referring now to FIGS. 3–6, feedgate 70 controls the dispensement rate of materials 34 within dump body 12. Feedgate is manually positioned in its various open and closed positions to control the flow rate of materials through opening 60. As shown in FIG. 3, feedgate 70 is in the closed position. In the closed position, the base of cap 76 is in contact with and in parallel relationship to base 20 of dump body 12 and edge guard 80 extends into conveyor recess 50 and into contact with conveyor belt 42. This closed position essentially seals opening 60 thereby preventing materials 34 from exiting through the opening even when conveyor system 40 is in operation.

Figure 4:
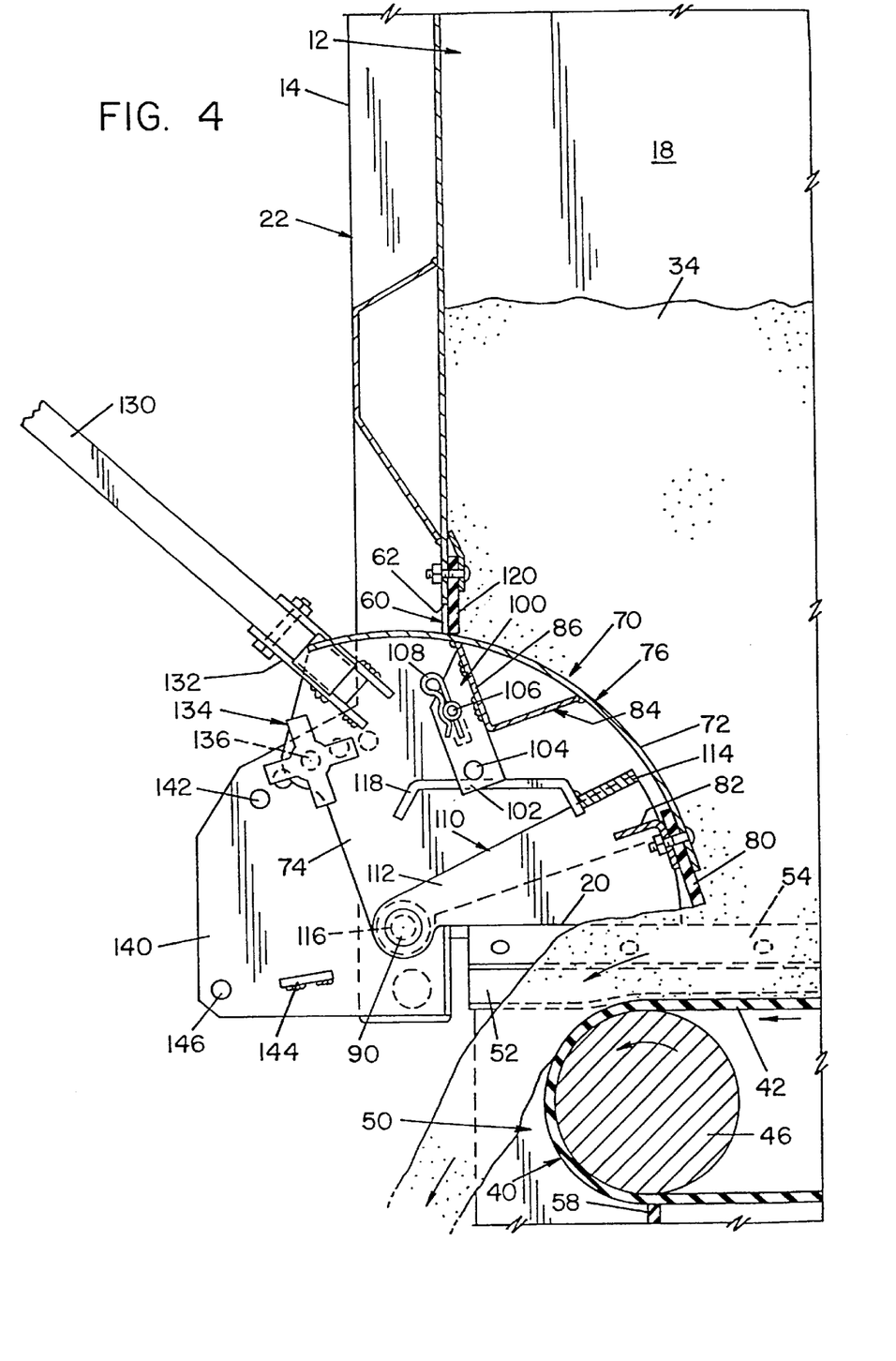
FIG. 4 is a cross-sectional view taken along the same cross-section as in FIG. 3 wherein the rotatable feedgate is positioned in a slightly open position.

Referring now to FIG. 4, feedgate 70 is in a slightly open position to allow a small amount of materials 34 within dump body 12 to exit through opening 60. Lever 130 is pulled down by an operation until the feedgate is opened to the desired position. Feedgate is then locked into position by inserting lock pin 134 into lock holes 142. The base of cap 76 moves in a non-parallel relationship to base 20 as the cap is rotated into an open position. The rate of flow of material 34 through opening 60 is maintained relatively constant by the operation of conveyor system 40 to continuously force material 34 under cap 76 and through opening 60. Side guide 110 is shown to be resting on base 20 of dump body 12. The side guide prevents the flow of material under side plate 74 and only allows the material to pass under face plate 72 of cap 76. As shown in FIG. 4, the sides of are extended by side guide 110 as cap 76 is moved into an open position. Such a configuration allows for greater control of the flow of material through opening 60, especially at low material flow rates. Although not shown, side guide 110 can be mounted such that it will raise up from base 20 of dump body 12 simultaneous with cap 76. Such a configuration is achieved by placing holder pin 106 through holder holes 104 located below guide bar 118 when feedgate 70 is in the closed position. Such a position of holder pin 106 will force guide bar 118 to be immediately lifted as cap 76 is moved to the open position thereby causing side guard 110 to be simultaneously lifted from base 20.

Figure 5:
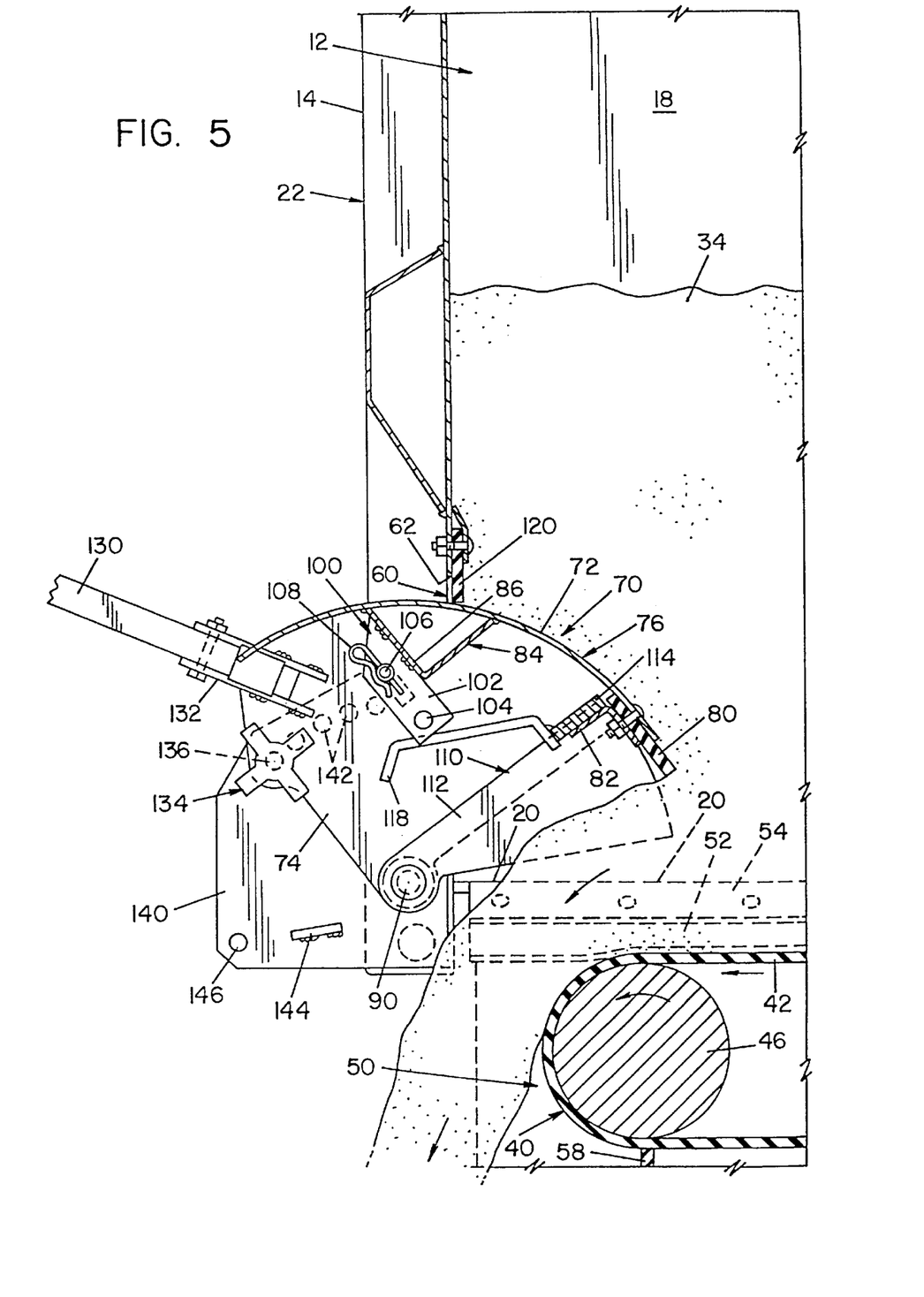
FIG. 5 is another cross-sectional view taken along the same cross-section as in FIG. 3 whereby the rotatable feedgate is positioned in a greater open position than shown in FIG. 4.

Referring now to FIG. 5, feedgate 70 is opened even more than shown in FIG. 4. Feedgate 70 is locked into position by lock pin 134. Side guide 110 is shown to be slightly raised from base 20 to allow additional amounts of material 34 to flow through opening 60. Side guide 110 is raised by guide lift 82 contacting guide top 114 and thereby causing side guide 110 to be raised. Conveyor system 40 is then operated to maintain a relatively even flow of material through opening 60.

Figure 6:
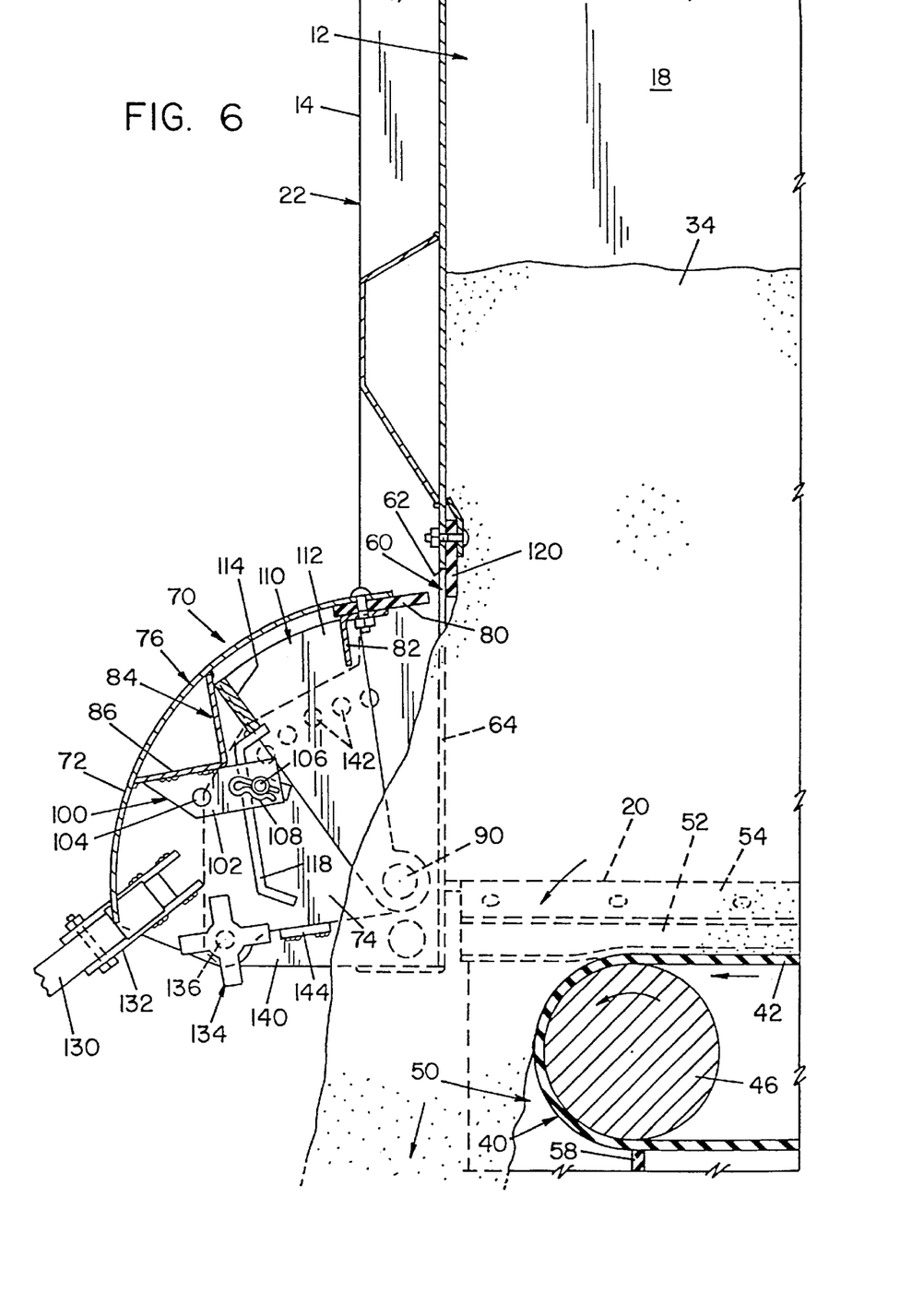
FIG. 6 is still another cross-sectional view taken along the same cross-section as in FIG. 3 wherein the rotatably feedgate is in a completely open position.

Referring now to FIG. 6, feedgate 70 is illustrated in its completely open position whereby the edge of side plate 74 is resting on flange platform 144. Feedgate 70 is locked into the completely open position by inserting lock pin 134 into open lock hole 146 on lock flange 140. In the completely open position, the materials within dump body 12 freely pass through opening 60 at the maximum rates of dispensement. Conveyor system 40 is operated to assist in the high flow rate of material through opening 60. In the completely open position, side guide 110 is preferably locked into position to prevent it from moving by locking guide bar in bar holder 100 by holder pin 106, as shown in FIG. 6.

Although not shown, it can be appreciated that dump body 12 can be converted into an open hauling position by laying open tailgate 22. In such an operating mode, rotatable feedgate 70 is positioned in its completely open position to create a level surface on tailgate 22.

It will also be appreciated that conveyor system 40 may be remotely controlled by an operator in the driver's cab. Further, the feedgate and conveyor system can be connected to an automated system to provide from easy operation by an operator while driving the truck.

The invention has been described with reference to a preferred embodiment and alternates thereof. It is believed that many modifications and alterations of the embodiments disclosed will readily suggest themselves to those skilled in the art upon reading and understanding the detailed description of the invention. It is intended to include all such modifications and alterations insofar as they come within the scope of the present invention.

What is claimed is:

1. A receptacle that holds materials, said receptacle including a base, two side walls, a rear wall, an opening positioned in the rear wall to discharge materials from said receptacle, a conveyor positioned at least closely to the base of said receptacle and in substantially longitudinal alignment with said opening to convey materials in said receptacle through said opening in said rear wall, a feedgate mounted to move within said opening, and a mounting mechanism to moveably secure said feedgate in said opening; said feedgate having an edge portion extending transversely over a top of said conveyor to regulate the volume of said materials discharged through said opening, a securing arrangement including a first and second position to fix said feedgate edge in a vertically spaced position, said first position of said securing arrangement fixing said feedgate edge above said conveyor to regulate said materials passing under said feedgate edge before said materials are discharged through said opening by movement of said conveyor, second position of said securing arrangement fixing said feedgate edge in a vertically open position with said edge substantially removed from said conveyor to discharge said material through said opening in said tailgate substantially without regulation by said feedgate edge, said securing arrangement including a flange positioned adjacent to said feedgate and a lock mechanism to secure said feedgate to said flange in a fixed position relative to said flange.

2. A receptacle as defined in claim 1, wherein said flange of said securing arrangement is secured at least closely adjacent to said opening.

3. A receptacle as defined in claim 2, wherein said mounting mechanism provides for rotational movement of said feedgate within said opening and about a fixed axis.

4. A receptacle as defined in claim 3, wherein said fixed axis is positioned rearwardly of said opening.

5. A receptacle as defined in claim 4, wherein said receptacle is mounted on a track.

6. A receptacle as defined in claim 5, wherein said opening is substanti ally centrally located in said rear wall.

7. A receptacle as defined in claim 6, wherein said feedgate includes a face section and two side sections on opposite sides of said face section.

8. A receptacle as defined in claim 7, wherein said face section includes a curvilinear face plate.

9. A receptacle as defined in claim 8, wherein said rear wall is a pivotable tailgate.

10. A receptacle as defined in claim 9, wherein said feedgate includes at least one side flow limiter attached to the side of said edge portion of said feedgate.

11. A receptacle as defined in claim 1, wherein said lock mechanism includes a pin.

12. A receptacle as defined in claim 1, wherein said mounting mechanism provides for rotational movement of said feedgate within said opening and about a fixed axis.

13. A receptacle as defined in claim 12, wherein said fixed axis is positioned rearwardly of said opening.

14. A receptacle as defined in claim 1, wherein said receptacle is mounted on a truck.

15. A receptacle as defined in claim 1, wherein said opening is substantially centrally located in said rear wall.

16. A receptacle as defined in claim 1, wherein said feedgate includes a face section and two side sections on opposite sides of said face section.

17. A receptacle as defined in claim 1, wherein said rear wall is a pivotable tailgate.

18. A receptacle as defined in claim 1, wherein said feedgate includes at least one side flow limiter attached to the side of said edge portion of said feedgate.

19. A receptacle that is mounted in a track and formed to hold materials, said receptacle including a base and a rear wall, said base substantially lying in a base plane, said rear wall including a conveyor rear opening, a feedgate and a securing arrangement, said conveyor rear opening positioned at least closely adjacent to said base plane to allow dispensement of said materials from said receptacle, said feedgate including a face section, said feedgate regulating the flow of said materials through said conveyor rear opening, said feedgate movable between a closed position, a regulation position and a non-regulation position and being secured in position by said securing arrangement, said feedgate rotatably mounted in a fixed axis lying at least closely adjacent to said base plane, said regulation position substantially controlling the flow of said materials passing under said feedgate and through said conveyor rear opening, said non-regulation position allowing said materials to substantially freely flow through said conveyor opening, said closed position substantially preventing said materials to pass through said conveyor rear opening, said conveyor mounted at least closely to said base and in longitudinal alignment with said conveyor rear opening.

20. A receptacle as defined in claim 19, wherein said fixed axis is positioned adjacent to and rearwardly of said conveyor rear opening.

21. A receptacle as defined in claim 20, wherein said conveyor is mounted below said base plane.

22. A receptacle as defined in claim 21, including a lock arrangement to secure said feedgate in at least one position in said regulation position.

23. A receptacle as defined in claim 22, wherein said feedgate includes at least one side flow limiter is positioned at least closely adjacent to the side of said face section of said feedgate.

24. A receptacle as defined in claim 23, wherein said face section includes a curvilinear face plate.

25. A receptacle as defined in claim 24, wherein said receptacle includes two side walls, said rear wall being pivotally attached to said two side walls.

26. A receptacle as defined in claim 19, including a lock arrangement to secure said feedgate in at least one position in said regulation position.

27. A receptacle that holds materials, said receptacle including a base, and at least one wall, an opening position in the wall to discharge materials from said receptacle, a feedgate mounted to move between a closed position and a fully open position within said opening, a mounting mechanism to moveably secure said feedgate in said opening, and a lock mechanism to fix said feedgate in at least one position between the closed position and the fully open position; said mounting mechanism secured to said wall and about said opening, said lock mechanism positioned about said opening, said feedgate having a bottom edge portion extending transversely over a top of said receptacle base to regulate the volume of said materials discharged through said opening when the feedgate bottom edge is vertically spaced above said base between a first and second position, said first position of said feedgate positioning said feedgate bottom edge above said receptacle base to at least partially interfere with and to regulate said materials passing under said feedgate bottom edge before said materials are discharged through said opening, second position of said feedgate positioning said feedgate bottom edge in said fully open position above said receptacle base to allow substantially unregulated flow of said materials passing under said feedgate bottom edge and through said opening.

28. A receptacle as defined in claim 27, including a conveyor positioned at least closely to the base of said receptacle and in substantially longitudinal alignment with said opening to convey materials in said receptacle through said opening.

29. A receptacle as defined in claim 28, wherein said bottom edge of said feedgate moves in an acuate path above said receptacle base between said first and second position.

30. A receptacle as defined in claim 29, wherein said mounting mechanism provides for rotational movement of said feedgate within said opening and about a fixed axis.

31. A receptacle as defined in claim 30, wherein said fixed axis is positioned rearwardly of said opening.

32. A receptacle as defined in claim 31, wherein said mounting mechanism connects to said feedgate on both sides of said opening.

33. A receptacle as defined in claim 32, wherein said fixed axis of rotation of said feedgate lies at least closely adjacent to the base plane of said base of said receptacle.

34. A receptacle as defined in claim 33, wherein said opening is substantially centrally located in a rear wall.

35. A receptacle as defined in claim 34, wherein said feedgate includes a face section and two side sections on opposite sides of said face section.

36. A receptacle as defined in claim 35, wherein said face section includes a curvilinear face plate.

37. A receptacle as defined in claim 36, wherein said rear wall is a pivotable tailgate.

38. A receptacle as defined in claim 37, wherein said feedgate includes at least one side flow limiter attached to the side of said side edge portion of said feedgate.

39. A receptacle as defined in claim 38, wherein said conveyor is mounted below the plane of said base of said receptacle.

* * * * *